(12) United States Patent
Böhn

(10) Patent No.: US 10,119,757 B2
(45) Date of Patent: Nov. 6, 2018

(54) DRYING APPARATUS AND DRYER FOR A TEXTILE WEB COMPRISING AN IMPROVED DEVICE FOR INTRODUCING HEAT

(71) Applicant: TRUETZSCHLER GMBH & CO. KG, Moenchengladbach (DE)

(72) Inventor: Markus Böhn, Hainburg (DE)

(73) Assignee: TRUETZSCHLER GMBH & CO. KG, Moenchengladbach (DE)

( * ) Notice: Subject to any disclaimer, the term of this patent is extended or adjusted under 35 U.S.C. 154(b) by 0 days.

(21) Appl. No.: 15/602,037

(22) Filed: May 22, 2017

(65) Prior Publication Data
US 2017/0336140 A1    Nov. 23, 2017

(30) Foreign Application Priority Data
May 23, 2016  (DE) .................. 10 2016 109 415

(51) Int. Cl.
| F26B 3/02 | (2006.01) |
| F26B 3/04 | (2006.01) |
| F26B 3/06 | (2006.01) |
| F26B 13/16 | (2006.01) |
| F26B 21/00 | (2006.01) |
| F26B 21/10 | (2006.01) |

(52) U.S. Cl.
CPC ............. *F26B 3/02* (2013.01); *F26B 3/04* (2013.01); *F26B 3/06* (2013.01); *F26B 13/16* (2013.01); *F26B 21/003* (2013.01); *F26B 21/10* (2013.01)

(58) Field of Classification Search
CPC ...... F26B 3/02; F26B 3/04; F26B 3/06; F26B 13/16; F26B 21/003; F26B 21/10
USPC .................. 34/327; 26/97; 156/538
See application file for complete search history.

(56) References Cited

U.S. PATENT DOCUMENTS 3,727,325 A * 4/1973 Fleissner ............ D06B 19/0041
26/90
3,811,988 A * 5/1974 Fleissner ................. D04H 1/54
156/311

(Continued)

FOREIGN PATENT DOCUMENTS

DE       43 25 915 A1    2/1995
DE   202011005041 U1 *  5/2012  .............. F26B 13/16

(Continued)

OTHER PUBLICATIONS

EP Search Report, dated Jun. 30, 2017, for related EP Application No. 17165186.2, and English translation thereof.

*Primary Examiner* — Stephen M Gravini
(74) *Attorney, Agent, or Firm* — FisherBroyles, LLP; Robert Kinberg

(57) ABSTRACT

A drying apparatus includes a dryer for a textile web. The dryer includes a drying chamber and at least one air-permeable drum arranged to rotate in the drying chamber. The textile web is guidable over a partial section of the circumference of the drum and heated drying air is flowable through the textile web. The dryer further includes a device to introduce heat for heating up the drying air. The device includes an internal hot gas source and an external hot gas source. The internal hot gas source is a component of the dryer and the external hot gas source is arranged peripherally to the dryer and includes a hot gas line connected at least indirectly to the dryer.

10 Claims, 3 Drawing Sheets

(56) References Cited

U.S. PATENT DOCUMENTS

| | | | | |
|---|---|---|---|---|
| 3,889,325 | A * | 6/1975 | Fleissner | D04H 1/06 26/18.5 |
| 4,137,646 | A * | 2/1979 | Fuhring | F26B 13/10 34/115 |
| 4,677,761 | A * | 7/1987 | Rattner | F26B 13/16 34/108 |
| 4,693,015 | A * | 9/1987 | Hemsath | F26B 13/186 34/119 |
| 4,693,016 | A * | 9/1987 | Yamazaki | F26B 13/16 34/115 |
| 5,625,962 | A | 5/1997 | Fleissner | |
| 5,669,155 | A * | 9/1997 | Hughes | F26B 13/16 34/115 |
| 5,713,138 | A * | 2/1998 | Rudd | F26B 13/14 34/124 |
| 5,791,065 | A * | 8/1998 | Gamble | F26B 13/186 165/89 |
| 5,966,835 | A * | 10/1999 | Bakalar | D21F 5/002 34/119 |
| 6,199,296 | B1 * | 3/2001 | Jewitt | D21F 5/182 34/115 |
| 6,877,246 | B1 * | 4/2005 | Hada | D21F 5/182 34/119 |
| 7,690,131 | B2 * | 4/2010 | Mausser | D21F 5/021 162/358.1 |
| 7,716,850 | B2 * | 5/2010 | Deem | D21F 5/181 162/359.1 |
| 8,225,527 | B2 * | 7/2012 | Sferlazzo | C23C 14/562 204/298.24 |
| 9,696,088 | B2 * | 7/2017 | Bohn | F26B 21/02 |
| 2015/0267965 | A1 | 9/2015 | Boehn et al. | |
| 2016/0312391 | A1 * | 10/2016 | Weigert | D04H 1/54 |
| 2017/0114486 | A1 * | 4/2017 | Muenstermann | D06B 23/025 |
| 2017/0336140 | A1 * | 11/2017 | Bohn | F26B 3/02 |
| 2017/0336142 | A1 * | 11/2017 | Bohn | F26B 11/028 |

FOREIGN PATENT DOCUMENTS

| | | | |
|---|---|---|---|
| DE | 10 2012 109 878 B4 | 4/2015 | |
| DE | 102016109415 A1 * | 11/2017 | F26B 3/02 |
| EP | 1 371 925 A1 | 12/2003 | |
| EP | 2 543 643 A1 | 1/2013 | |
| GB | 788254 A * | 12/1957 | B41F 23/042 |
| GB | 913723 A * | 12/1962 | D06B 11/44 |

* cited by examiner

DRYING APPARATUS AND DRYER FOR A TEXTILE WEB COMPRISING AN IMPROVED DEVICE FOR INTRODUCING HEAT

CROSS-REFERENCE TO RELATED APPLICATION

Priority is claimed to German Application No. 10 2016 109 415.3, filed May 23, 2016, the disclosure of which is incorporated herein by reference in its entirety.

BACKGROUND OF THE INVENTION

The present invention relates to a drying apparatus with a dryer for a textile web, having a drying chamber with at least one air-permeable drum positioned rotating therein, wherein the textile web is guided over a partial section of the drum circumference, wherein heated drying air can flow through the textile web, and wherein a device for introducing heat is provided for heating up the drying air.

The DE 10 2012 109 878 B4 discloses a dryer for a textile web, comprising a drying chamber in which several air-permeable drums are arranged rotating. Via the suction side, a ventilator pulls moist drying air from the inside of the drum, wherein each drum is assigned a separate ventilator. The suction draft formed with the drying air in front of the ventilator, flows through the ventilator and travels to the heating and ventilation chamber. An intermediate chamber is positioned between an end face of the drums and the heating and ventilation chamber and forms a closed chamber which, however, is in contact with the suction draft. The moist drying air consequently flows from the inside of the drum into the intermediate chamber, and the ventilator finally suctions in the drying air via its suction side and releases it to the heating and ventilation chamber. Fresh air is added to the drying air in the intermediate chamber, and a portion of the moist drying air is discharged as exhaust air from the intermediate chamber. It is proposed that in order to improve the effect, a heat exchanger is used to heat up the suctioned-in fresh air with the aid of the discharged exhaust air, so that the fresh air is pre-heated when it enters the intermediate chamber. The effectiveness of the dryer can thus be increased in that less heating energy must be introduced by the heating elements arranged in the heating and ventilation chamber because of the pre-heating of the fresh air.

The heating elements are be designed such that the heat required for realizing the drying process can be provided completely by the dryer.

Depending on the shape and size as well as moisture content of the textile web, dryers of interest require heating capacities ranging from one to several megawatts. If the heating capacity is made available by gas blower burners, for example, then these must be dimensioned accordingly. In the process, up to 1.5 kWH may be necessary for each kilogram of textile web, so that it is desirable to advantageously modify the device for introducing heat.

SUMMARY OF THE INVENTION

An object of the invention is to further improve a drying apparatus with a dryer for a textile web which comprises an improved device for introducing energy. The invention furthermore relates to a dryer for a drying apparatus which is embodied for use with the improved device for introducing energy.

The above and other objects are achieved according one embodiment of the invention wherein there is provided drying apparatus including: a dryer for a textile web, the dryer including a drying chamber and at least one air-permeable drum arranged to rotate in the drying chamber, wherein the textile web is guidable over a partial section of the circumference of the drum and heated drying air is flowable through the textile web; and a device to introduce heat for heating up the drying air, the device comprising an internal hot gas source and an external hot gas source, wherein the internal hot gas source is a component of the dryer and the external hot gas source is arranged peripherally to the dryer and includes a hot gas line connected at least indirectly to the dryer.

The invention thus involves the technical teaching that the device for introducing heat comprises an internal hot gas source and an external hot gas source, wherein the internal hot gas source forms a component of the dryer and the external hot gas source is positioned peripherally to the dryer and is connected at least indirectly to the dryer via a hot gas line.

The invention is characterized by at least a two-part device for introducing heat, with an internal hot gas source and an external hot gas source. Dryers containing an internal hot gas source for heating up the drying air are already known. The device according to the invention for introducing heat additionally comprises an external hot gas source, so that a drying apparatus is formed together with the dryer and the external hot gas source. The external hot gas source in this case is arranged peripherally to the dryer, so that the external hot gas source does not form a single structural unit with the dryer. The external hot gas source is connected at least indirectly via the hot gas line to the dryer.

The at least one indirect connection of the hot gas line to the dryer relates to an embodiment for which the external hot gas source directly produces a heating gas, for example a flue gas, which is conducted via the hot gas line directly to the dryer. With only indirect connections, it is conceivable according to another embodiment that at least one heat exchanger is installed between the external heating source and the dryer, so that the hot air need not be conducted directly into the dryer. However, the energy flow takes place effectively from the external hot gas source into the dryer.

The invention makes use of the option of using external hot gas sources which may exist in the periphery of the dryer for heating up the drying air. As a result, the internal hot air source can be operated with a lower energy, so that incoming gases, such as combustion gas or liquid fuel, can be saved.

In another embodiment of the drying apparatus, the internal hot gas source is a gas blower burner that is arranged in or on the dryer. The internal hot gas source consequently forms a structural unit together with the dryer. The external heating source may be a cogeneration plant (CHP) which conducts heat via the hot gas line at least indirectly into the drying chamber. Cogeneration plants can, for example, form a component of a building installation in which the dryer is operated. Starting with a dryer embodied, in a manner known per se, with an internal hot gas source, the drying apparatus may be formed with a cogeneration plant. By way of the hot gas line, heat may be conducted from the cogeneration plant to the dryer, wherein the flue gas of the cogeneration plant need not be conducted directly via the hot gas line into the dryer, in particular the drying chamber. At least one heat exchanger can be provided with the hot gas line extending to it.

In a further embodiment, a control unit controls the internal hot gas source and the external hot gas source. The control unit may be designed for controlling the hot gas sources in so that the external hot gas source forms the basic heat supply for the dryer and the internal hot gas source functions to regulate the temperature of the drying air. If the internal as well as the external hot gas source is utilized for heating the drying air, the heat influxes from the internal and the external hot gas source are added. According to an embodiment, the external hot gas source may form the basic heat supply for heating up the drying air. Through correspondingly actuating the internal hot gas source, for example, a gas blower burner can be used for adjusting an effective drying air temperature to be supplied to the drying chamber. As a result, the drying apparatus according to the invention may allow making the necessary adjustment of the total amount of introduced heat, despite a constant external basic heat supply for the dryer, for example, without having to influence directly the operation of the external heat source, meaning in particular the cogeneration plant.

According to another embodiment, the dryer includes a mixing module to which the internal and the external heat sources are connected for feeding heat into the mixing module, wherein hot gases from the hot gas sources can be mixed inside the mixing module, and wherein the mixed hot gas can be released into the drying air for heating it up. The mixing module serves to mix the supplied hot gases, so that a thermo-dynamic average temperature results from the two supplied heating gases for the hot gas released from the mixing module to the drying air.

To actuate the mixing module, a control unit may be connected to it. The mixing module comprises a control member for controlling the feed-in of hot gases from the hot gas sources for the mixing. For example, the mixing ratio of the two hot gases from the internal and the external hot gas source can be regulated with the mixing member, wherein it is also conceivable that the mixing member is embodied for regulating the total infeed of heat into the drying air.

According to a further embodiment, the dryer is provided with a first heat exchanger through which hot gas from the first external hot gas source flows and which can release heat to the drying air. Depending on the embodiment of the external hot gas source, installing the first heat exchanger achieves that the flue gas from the external hot gas source does not come in contact with the material web. Because heat losses occur when using a heat exchanger, the hot gas may be conducted out of the first heat exchanger and may be used to introduce additional energy into the dryer.

According to an embodiment, an additional fresh-air heat exchanger may be provided through which hot gas from the external hot gas source flows, wherein the fresh-air heat exchanger is installed downstream of the first heat exchanger, and wherein fresh air flowing into the drying chamber can be heated via the fresh-air heat exchanger before entering the drying chamber. The hot gas from the external hot gas source consequently flows first into the first heat exchanger and subsequently into the fresh-air heat exchanger. In the process, the heat from the hot gas of the external hot gas source can be released cascade-like into the drying air.

According to yet another embodiment, a preheat exchanger is provided with the hot gas line from the external hot gas source extending into it, which is designed to transfer heat to heating fluid in a fluid line which is connected to a first heat exchanger of the dryer. The heating fluid may be a thermal oil, for example, which is heated up in the preheat exchanger via the heating gas from the external source, for example the flue gas of a cogeneration plant. The thermal oil is then transferred to the first heat exchanger of the dryer to heat up the drying air via the first heat exchanger. A preheat exchanger also achieves that hot gas from the external hot gas source cascade-like flows first through the preheat exchanger and then the fresh-air heat exchanger. In the process, the heat from the hot gas coming from the external hot gas source can be released better to the drying air.

According to a further embodiment of the drying apparatus, at least one element for measuring moisture in the drying air is provided in the drying chamber, wherein the control unit is embodied to read the measuring values of the moisture measuring element and actuates the hot gas sources in dependence on the moisture values. With the aid of the moisture measuring element and the control unit, the heat introduced from the two hot gas sources, in particular via the mixing module, can be regulated so that a desired moisture value in the drying air is reached. The control unit provides for a maximum utilization of the external heat source, so that the internal heat source, for example the gas blower burner, is operated if possible at a minimum energy level.

According to another aspect of the invention there is provided a dryer for a textile web to be arranged in a drying apparatus as described above. In one embodiment, the dryer includes: a drying chamber; at least one air-permeable drum arranged to rotate in the drying chamber, wherein the textile web is guidable over at least a partial circumference of the drum and heated drying air is flowable through the textile web; an internal hot gas source to heat up the drying air, and a heat exchanger through which hot gas from an external hot gas source is flowable and by which heat is releasable to the drying air.

In a further embodiment, a control unit is provided as a component of the dryer, wherein the control unit is designed to control the external and the internal hot gas source. The control unit may actuate the hot gas sources so that the external hot gas source forms a basic heat supply for the dryer and the internal hot gas source forms a temperature control means for the drying air.

According to one embodiment, the dryer is provided with a mixing module to which the internal hot gas source and the external hot gas source are connected for feeding in heat and the hot gases from the hot gas sources can be mixed in the mixing module, wherein the mixed hot gas can be released to the drying air for heating it up.

BRIEF DESCRIPTION OF THE DRAWINGS

Additional measures to improve the invention are described in further detail in the following with the description with the aid of the Figures, in which.

DETAILED DESCRIPTION OF THE INVENTION

Figure 1:
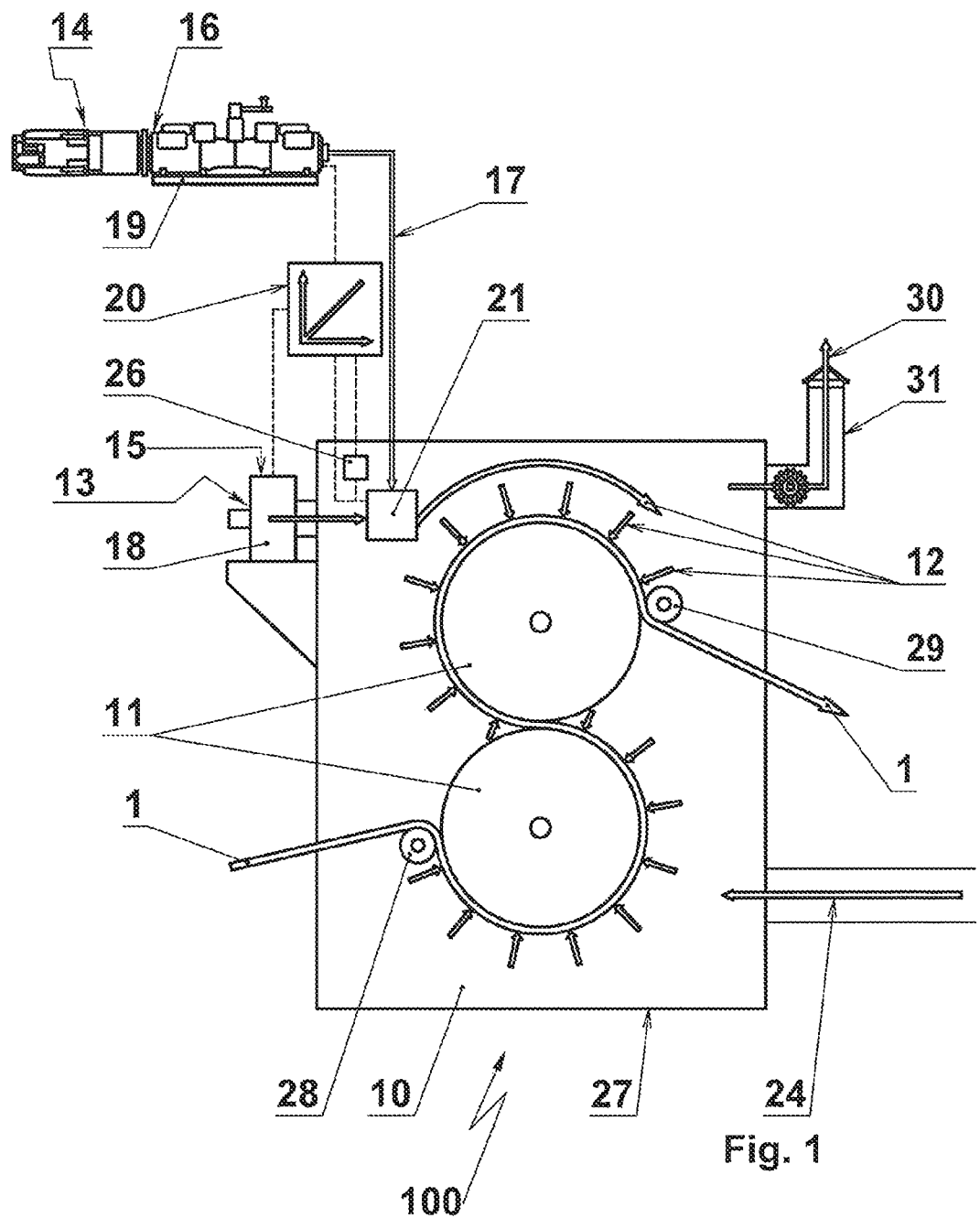
FIG. 1 is a schematic view of a drying apparatus with a dryer and an external hot gas source which comprises a cogeneration plant.
Figure 2:
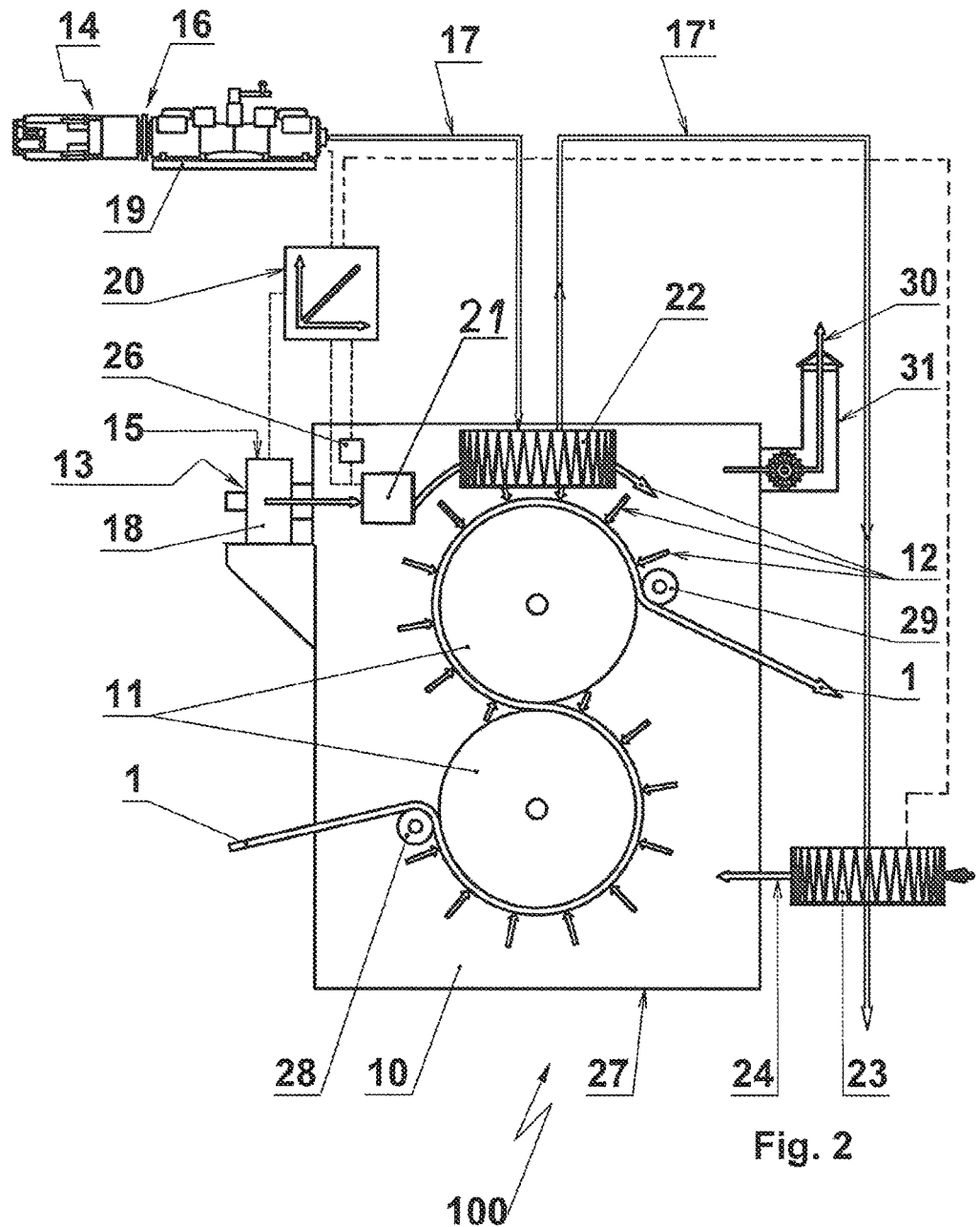
FIG. 2 is a variant of the exemplary embodiment according to FIG. 1 with a first heat exchanger in the dryer.
Figure 3:
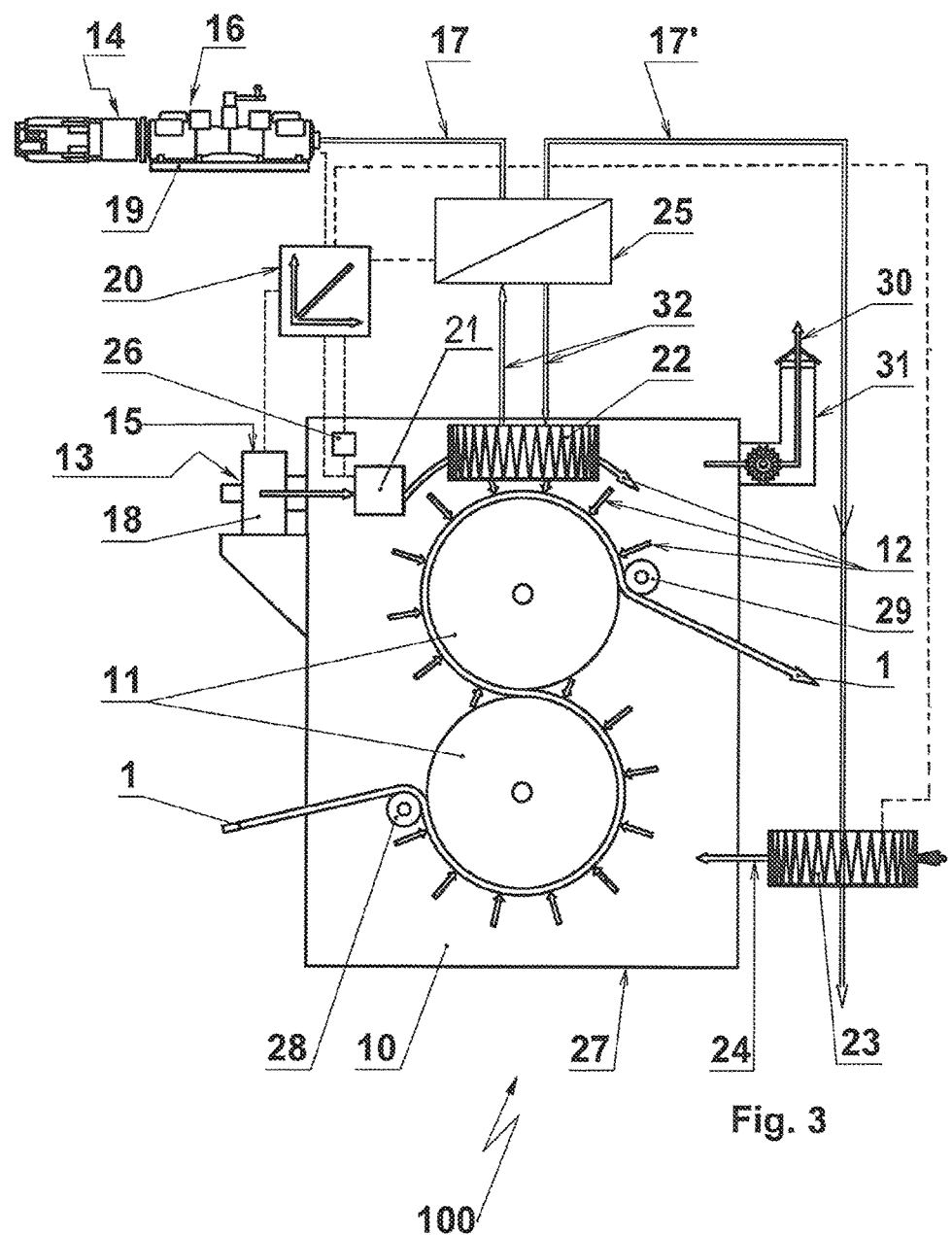
FIG. 3 is a different variant of the dryer according to FIG. 2, wherein a preheat exchanger is installed, which forms an internal heat exchanging loop together with the first heat exchanger.

FIGS. 1, 2 and 3 respectively show a drying apparatus with a dryer 100 for drying a textile web 1. The dryer 100 comprises a housing 27 with therein formed drying chamber 10. Shown are two air-permeable drums 11 which are arranged rotating in the drying chamber 10. The textile web 1 initially wraps around the first drum 11 and then the second drum 11. A roller 28 functions as intake roller and to supply of the textile web 1 to the first drum 11 while a discharge roller 29 is used to discharge the textile web 1 from the second drum 11.

Several arrows show that drying air 12 can flow through the textile web 1 arranged around the outside circumference of the drum 11, so that the drying air collects on the inside of the drum 11 from which it is suctioned out with devices not shown further herein.

A portion of the drying air 12 is released as exhaust air 30 via an exhaust-air device 31 from the drying chamber 10 while fresh air 24 is supplied to the drying chamber 10, which then mixes with the drying air 12.

A first device 13 for introducing heat takes the form of an internal hot gas source 15, wherein for the exemplary embodiments the internal hot gas source 15 is a gas blower burner 18.

The drying apparatus furthermore comprises an external hot gas source 16 which forms an additional device 14 for introducing heat. The external hot gas source 16 may comprises a cogeneration plant 19. Hot gas flows from the cogeneration plant 19 via a hot gas line 17, wherein the heat from the cogeneration plant 19 is supplied directly or indirectly to the drying air 12 in the drying chamber 10.

FIG. 1 shows an exemplary embodiment in which the hot gas line 17 is supplied to a mixing module 21 in the drying chamber 10. The hot gas from the internal hot gas source 15 as well as the hot gas from the external hot gas source 16 is supplied via the hot gas line 17 to the mixing module 21. The hot gases are mixed in the mixing module and are then released to the drying air 12.

The embodiment according to FIG. 1 furthermore shows a control unit 20 which is connected to the cogeneration plant 19 and the gas blower burner 18, so as to activate these accordingly. Also shown is a connection between the control unit 20 and the mixing module 21, designed to activate the mixing module 21 such that the highest possible energy amount is contributed by the external hot gas source 16 to the drying air 12 and so that the internal hot gas source 15 is operated at the lowest possible energy level.

A measuring element 26 for measuring the moisture may be connected to the control unit 20 to measure the degree of moisture in the drying air 12 in order to correspondingly activate the internal and external hot gas sources 15 and 16, and in particular the mixing module 21.

FIG. 2 shows a modified embodiment compared to the embodiment of FIG. 1, wherein hot gas from the cogeneration plant 19 is supplied via the hot gas line 17 to a first heat exchanger 22. The drying air 12 is heated via the first heat exchanger 22, wherein the introduced heat is initially supplied to the mixing module 21.

The hot gas line extends again out of the first heat exchanger 22 as hot gas line 17' which may lead to a fresh air heat exchanger 23 for preheating the fresh air 24 that enters the drying chamber 10. This results in an even better use of the amount of heat energy supplied by the cogeneration plant 19.

FIG. 3 shows the exemplary embodiment according to FIG. 2 with an additional heat exchanger forming a preheat exchanger 25.

The heat from the hot gas in the line 17, coming from the cogeneration plant 19, is transferred to the preheat exchanger 25, which exchanges the heat for a heating fluid, such as a thermal heating oil, in a fluid line 32. Once the hot gas from the hot gas line 17 moves through, it continues in the hot gas line 17' line to the fresh air heat exchanger 23 to preheat the fresh air 24 entering the drying chamber 10, as previously described in connection with FIG. 2. The preheat exchanger 25 can be arranged near the cogeneration plant 19, in particular it is possible for the preheat exchanger 25 to form a single structural unit with the external hot air source 16, resulting in the advantage of a better transportability of the heat in a heating fluid in the fluid line 32, to be supplied to the heat exchanger 22.

The control unit 20 and moisture measuring element 26, shown and described in connection with FIG. 1, are shown installed in a similar manner for the embodiments according to FIG. 2 and FIG. 3. In particular, it is possible to use the control unit 20 to activate the preheat exchanger 25 shown in FIG. 3 and/or the fresh air heat exchanger 23 shown in FIGS. 2 and 3, for example, to control the amount of the respective energy transfer or energy introduction.

It will be understood that the above description of the present invention is susceptible to various modifications, changes and adaptations, and that the same are intended to be comprehended within the meaning and range of equivalents of the appended claims.

What is claimed is:

1. A drying apparatus, comprising:
   a dryer for a textile web, the dryer including a drying chamber and at least one air-permeable drum arranged to rotate in the drying chamber, wherein the textile web is guidable over a partial section of a circumference of the drum and heated drying air from the drying chamber is flowable through the textile web;
   a device to introduce heat for heating up the drying air, the device comprising an internal hot gas source and an external hot gas source, wherein the internal hot gas source is a component of the dryer and the external hot gas source is arranged peripherally to the dryer and includes a hot gas line connected at least indirectly to the dryer;
   a first heat exchanger adapted to release heat to the drying air; and
   a preheat exchanger and a fluid line coupling the preheat exchanger to the first heat exchanger, wherein the hot gas line of the external hot gas source extends into the preheat exchanger and transfers heat to a heating fluid in the fluid line.

2. The drying apparatus according to claim 1, wherein the internal hot gas source includes a gas blower burner arranged in or on the dryer.

3. The drying apparatus according to claim 1, wherein the external hot gas source includes a cogeneration plant which transfers via the hot gas line at least indirectly heat into the drying chamber.

4. The drying apparatus according to claim 1, further including a control unit coupled to the internal hot gas source and to the external hot gas source and configured to control the internal hot gas source and the external hot gas source.

5. The drying apparatus according to claim 4, wherein the control unit is configured to control the internal and external hot gas sources so that the external hot gas source serves as a basic heat supply for the dryer and the internal hot gas source functions to control the temperature of the drying air.

6. The drying apparatus according to claim 1, further including a fresh air heat exchanger coupled to the external hot gas source and to the drying chamber, wherein hot gas from the external hot gas source is flowable through the fresh air heat exchanger, wherein the fresh air heat exchanger is arranged downstream of the preheat exchanger and fresh air entering the drying chamber is heatable by the fresh air heat exchanger prior to entering the drying chamber.

7. The drying apparatus according to claim 4, further including at least one measuring element to measure moisture in the drying air in the drying chamber, wherein the control unit is coupled to the measuring element to read moisture values out of the measuring element and to actuate the internal and external hot gas sources in dependence on the moisture values.

8. A dryer for a textile web, comprising:
   a drying chamber;
   at least one air-permeable drum arranged to rotate in the drying chamber, wherein the textile web is guidable over at least a partial circumference of the drum and heated drying air is flowable through the textile web;
   an internal hot gas source to heat up the drying air;
   a first heat exchanger by which heat is releasable to the drying air; and
   a preheat exchanger and a fluid line coupling the preheat exchanger to the first heat exchanger, wherein a hot gas line of an external hot gas source extends into the preheat exchanger and transfers heat to a heating fluid in the fluid line.

9. The dryer according to claim 8, further including a control unit arranged to control the internal hot gas source and the external hot gas source.

10. The dryer according to claim 9, wherein the control unit actuates the hot gas sources so that the external hot gas source supplies heat to the dryer and the internal hot gas source functions to regulate a temperature of the drying air.

* * * * *